(12) United States Patent
Huang

(10) Patent No.: US 10,151,326 B2
(45) Date of Patent: Dec. 11, 2018

(54) FAN FIXING DEVICE

(71) Applicant: NANNING FUGUI PRECISION INDUSTRIAL CO., LTD., Nanning (CN)

(72) Inventor: Ying-Jui Huang, New Taipei (TW)

(73) Assignee: NANNING FUGUI PRECISION INDUSTRIAL CO., LTD., Nanning (CN)

( * ) Notice: Subject to any disclaimer, the term of this patent is extended or adjusted under 35 U.S.C. 154(b) by 15 days.

(21) Appl. No.: 15/141,852

(22) Filed: Apr. 29, 2016

(65) Prior Publication Data

US 2017/0184126 A1 Jun. 29, 2017

(30) Foreign Application Priority Data

Dec. 28, 2015 (TW) .............................. 104144026 A

(51) Int. Cl.
*F04D 29/60* (2006.01)
*G06F 1/20* (2006.01)
*F04D 25/06* (2006.01)

(52) U.S. Cl.
CPC ....... *F04D 29/601* (2013.01); *F04D 25/0613* (2013.01); *G06F 1/20* (2013.01)

(58) Field of Classification Search
CPC .. F04D 29/601; F04D 25/0613; F04D 29/602; F04D 29/603; F04D 29/604; G06F 1/20; G06F 1/18; F06F 1/203; H05K 7/20136; H05K 7/20172; F21V 29/40; F21V 29/67
USPC .................. 248/682; 415/213.1; 361/679.48
See application file for complete search history.

(56) References Cited

U.S. PATENT DOCUMENTS

| | | | |
|---|---|---|---|
| 7,385,814 B1* | 6/2008 | Chen ...................... | G06F 1/183 165/122 |
| 2005/0088825 A1* | 4/2005 | Miyamura ................ | G06F 1/18 361/715 |
| 2005/0105269 A1* | 5/2005 | Chen .................. | H05K 7/20172 361/695 |
| 2005/0243512 A1* | 11/2005 | Peng ..................... | G06F 1/1613 361/690 |
| 2006/0099092 A1* | 5/2006 | Lu .......................... | F04D 29/601 417/423.1 |
| 2007/0035924 A1* | 2/2007 | Westphall ............... | G06F 1/183 361/679.48 |
| 2008/0019848 A1* | 1/2008 | Chen ..................... | F04D 29/601 417/360 |
| 2008/0149807 A1* | 6/2008 | Chen .................... | F04D 19/007 248/675 |

(Continued)

FOREIGN PATENT DOCUMENTS

| | | |
|---|---|---|
| CN | 203838620 U | 9/2014 |
| TW | I280700 | 5/2007 |
| TW | M475126 U | 3/2014 |

*Primary Examiner* — Christopher Garft
(74) *Attorney, Agent, or Firm* — ScienBiziP, P.C.

(57) ABSTRACT

A device for assembling a heat dissipation fan in a computer includes a cage, a handle, and a movable portion. The handle is rotatably fixed on the cage, the handle has a pushing pole and holes are defined at each distal end. The movable portion is movably and elastically connected to the cage. The movable portion includes a plate with a first limit pillar and a second limit pillar spaced from the first limit pillar; and an elastic element abutting the first limit pillar.

17 Claims, 11 Drawing Sheets

(56) References Cited

U.S. PATENT DOCUMENTS

| | | | |
|---|---|---|---|
| 2008/0253886 A1* | 10/2008 | Chen | F04D 29/601 415/213.1 |
| 2009/0034191 A1* | 2/2009 | Yin | F04D 25/0613 361/695 |
| 2009/0057524 A1* | 3/2009 | Chen | G06F 1/20 248/638 |
| 2009/0059521 A1* | 3/2009 | Yin | F04D 25/166 361/695 |
| 2010/0232976 A1* | 9/2010 | Li | G06F 1/20 416/244 R |
| 2012/0027580 A1* | 2/2012 | Lu | F04D 25/0613 415/214.1 |
| 2012/0145877 A1* | 6/2012 | Chiu | G06F 1/20 248/674 |
| 2012/0163971 A1* | 6/2012 | Chiu | F04D 29/601 415/213.1 |
| 2012/0326002 A1* | 12/2012 | Li | G06F 1/183 248/672 |
| 2012/0328449 A1* | 12/2012 | Xia | F04D 25/0613 416/244 R |
| 2013/0064662 A1* | 3/2013 | Gong | F04D 25/0613 415/213.1 |
| 2013/0155609 A1* | 6/2013 | Kuo | H05K 7/20172 361/679.48 |
| 2013/0329371 A1* | 12/2013 | Lee | G06F 1/183 361/724 |
| 2015/0070843 A1* | 3/2015 | Mao | H05K 7/20172 361/695 |
| 2015/0208548 A1* | 7/2015 | Chu | H05K 7/20172 361/695 |
| 2016/0073554 A1* | 3/2016 | Marcade | H05K 5/023 211/26 |

* cited by examiner

FAN FIXING DEVICE

CROSS-REFERENCE TO RELATED APPLICATIONS

This application claims priority to Taiwanese patent application no. 104144026, filed on Dec. 28, 2015, the contents of which are incorporated by reference herein.

FIELD

The subject matter generally relates to computer cooling, and particularly to a fan fixing device for fixing a heat dissipating fan in the computer.

BACKGROUND

A heat dissipation fan is typically assembled in the computer to dissipate heat generated from electric elements. A heat dissipation fan should be easy to fit into and disassemble from a computer, and a user or technician should be able to carry out such operations without having to take the whole computer apart.

BRIEF DESCRIPTION OF THE DRAWINGS

Implementations of the present technology will now be described, by way of example only, with reference to the attached figures.

DETAILED DESCRIPTION

Figure 1:
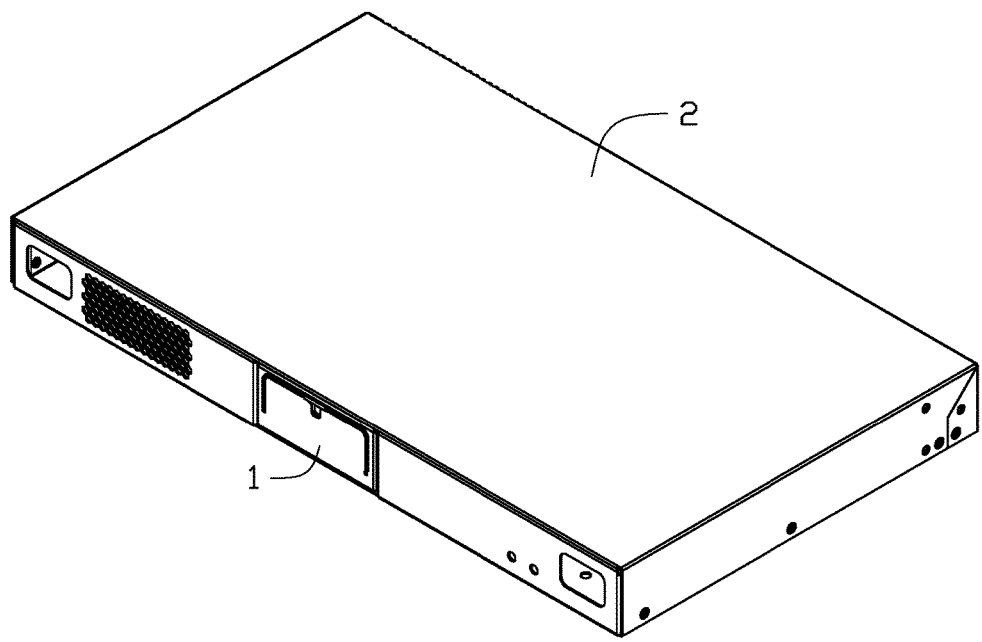
FIG. 1 is an isometric view of a fan fixing device assembled in a casing of a computer in accordance with an exemplary embodiment of the present disclosure.

It will be appreciated that for simplicity and clarity of illustration, where appropriate, reference numerals have been repeated among the different figures to indicate corresponding or analogous elements. In addition, numerous specific details are set fourth in order to provide a thorough understanding of the exemplary embodiments described herein. However, it will be understood by those of ordinary skill in the art that the exemplary embodiments described herein can be practiced without these specific details. In other instances, methods, procedures and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising," when utilized, means "including but not necessarily limited to"; it specifically indicates open-ended inclusion or membership in the so-described combination, group, series and the like.

The present disclosure is described in relation to a fan fixing device.

Figure 2:
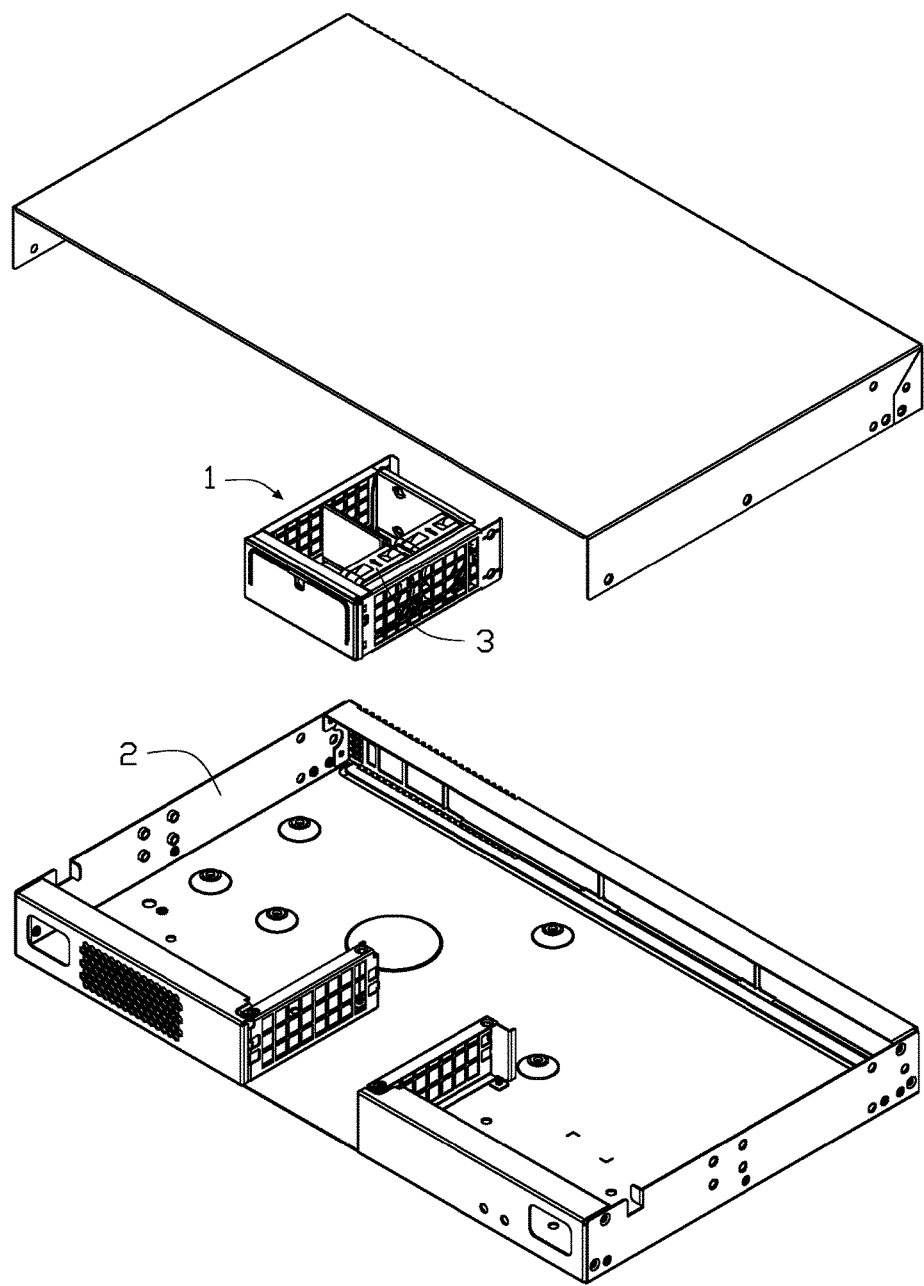
FIG. 2 is an isometric view of the fan fixing device of FIG. 1 separated from the casing.

FIGS. 1 and 2 illustrate a fan fixing device 1 configured for assembling a heat dissipation fan 3 in a casing 2 of a computer.

Figure 3:
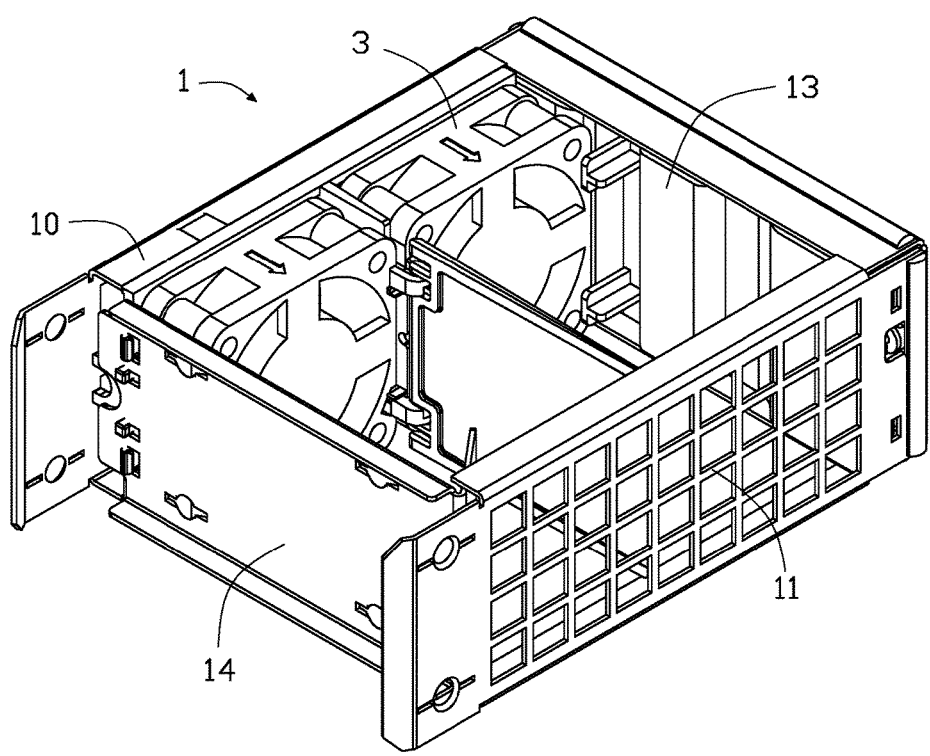
FIG. 3 is an isometric view of the fan fixing device in FIG. 1, the casing being omitted.
Figure 4:
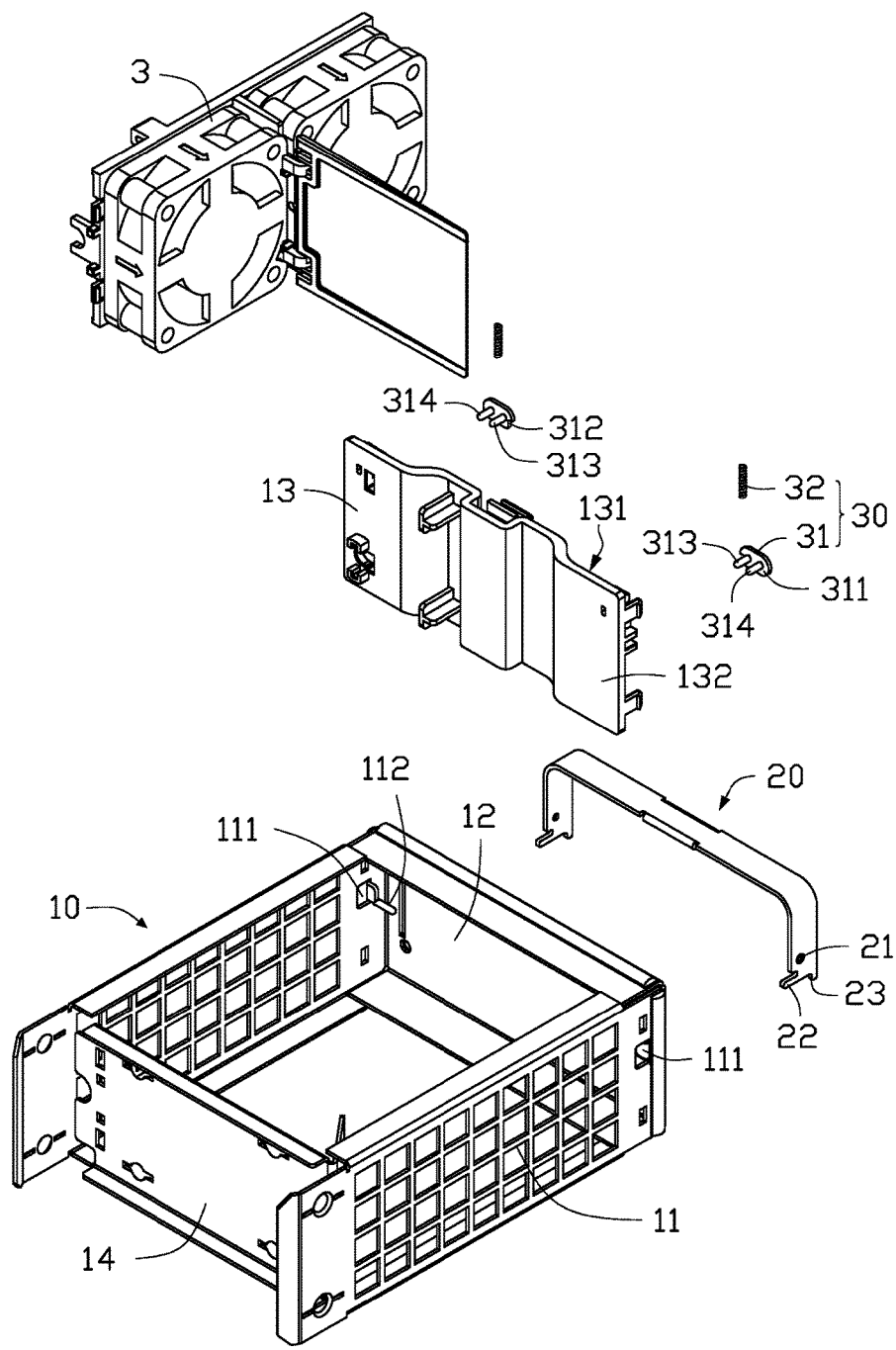
FIG. 4 is an exploded, isometric view of the fan fixing device in FIG. 3.
Figure 5:
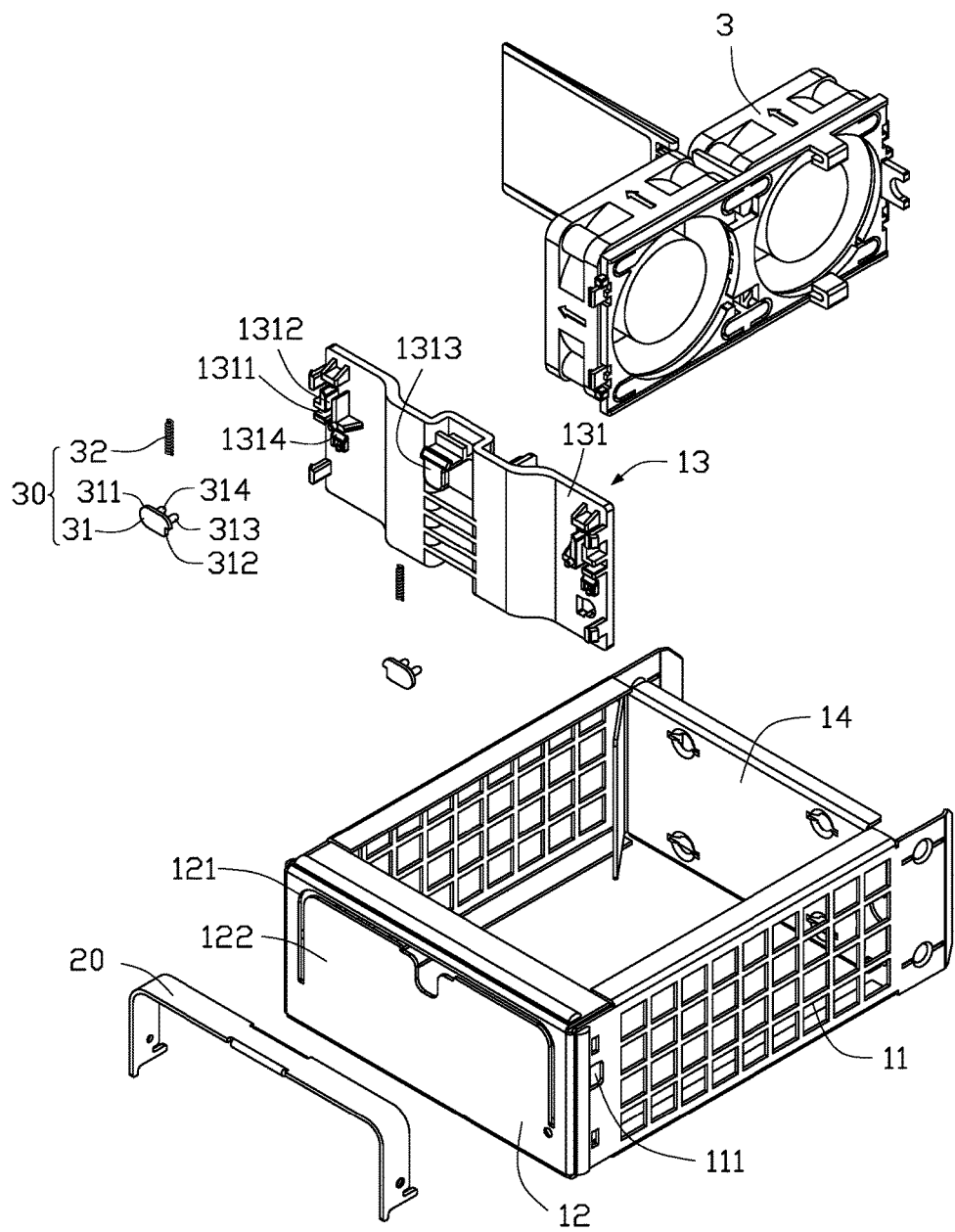
FIG. 5 is an enlarged isometric view of the fan fixing device in FIG. 3, from another angle.

FIGS. 3 to 5. show that the fan fixing device 1 includes a cage 10, a handle 20 fixed on the cage 10 and a movable portion 30 fixed in the cage 10. The fan fixing device 1 is received in the casing 2. The heat dissipation fan 3 is detachably assembled in the fan fixing device 1.

The movable portion 30 includes a plate 313 and an elastic element 32 abutting the plate 31.

The plate 31 is substantially rectangular. The plate 31 includes two opposite ends. One of the ends forms a protrusion 311, and the other one of the ends defines a gap 312. In the illustrated embodiment, the protrusion 311 is substantially half circle, and the gap 312 is substantially a quartering circle and opposite from the protrusion 311. Two limit pillars extend from the plate 31, named respectively as a first limit pillar 313 and a second limit pillar 314. The first pillar 313 is spaced from the second pillar 314, with a predetermined distance therebetween. The first limit pillar 313 is adjacent to the gap 312, and second limit pillar 314 is adjacent to the protrusion 311. The first limit pillar 313 and the second limit pillar 314 are both positioned on a center axle of the plate 31. The second limit pillar 314 is positioned at a circle center of the protrusion 311. The first limit pillar 313 is positioned at a circle center of the other end of the plate 31.

The elastic element 32 abuts one of the limit pillars. Further, an elastic force and elastic restoring force of the elastic element 32 are both in a vertical direction. In the illustrated embodiment, the elastic element 32 is a spring and abuts the first limit pillar 313. When the elastic force of the elastic element 32 is increased or decreased, the first limit pillar 313 of the movable portion 30 moves upwards or downwards vertically along the direction of the elastic force and the elastic restoring force. The second limit pillar 314 is limited to move in a horizontal direction. The plate 31 rotates with respect to the first limit pillar 313 while moving in the horizontal direction.

The handle 20 has a rotary connection with the cage 10. The handle 20 is substantially U shaped. Each distal end of the handle 20 forms a hole 21, a pushing pole 22, and a blocking pole 23. The handle 20 can rotate axially within the two holes 21, while each pushing pole 22 can rotate with respect to the hole 21. The pushing pole 22 extends perpendicularly to the distal end of the handle 20. In other words, the pushing pole 22 is perpendicular to the plane on which the U shaped handle 20 is located. The blocking pole 23 extends from the distal end of the handle 20 along a direction of the distal end of the handle 20 extending along. The blocking pole 23 is perpendicular to the pushing pole 22.

The handle 20 can be rotated from a horizontal state to a vertical state. When the handle 20 is at the vertical state, the pushing pole 22 is spaced from the movable portion 30 by a predetermined distance therebetween. When the handle 20 begins to be turned, the pushing pole 22 rotates with respect to the hole 21 and gets closer to the movable portion 30 until the pushing pole 22 contacts with the plate 31 of the movable portion 30. As the handle 20 keeps turning, the pushing pole 20 pushes the plate 31 upwards and forces the first limit pillar 313 to move upwards in a vertical direction and press the elastic element 32. Meanwhile, the second limit pillar 314 moves in a horizontal direction. When the handle 20 is loosened, the first limit pillar 313 moves downwards in the vertical direction under the elastic restoring force of the elastic element 32, the second limit pillar 314 moves in a contrary direction to the original position thereof. In the illustrated embodiment, the pushing pillar 22 defines a groove 221 at an inner side of the pushing pillar 22. The groove 221 can save space for the plate 31 when the handle 20 is turned at the horizontal state, thereby abutting the pushing 222 against the first limit pillar 313 of the plate 31.

The cage 10 is substantially rectangular. The cage 10 includes two side walls 11 on the left and right sides thereof and three boards connecting the two side walls 11. The three boards are an outer wall 12 adjacent to outer side of the casing 2, an inner wall 13 facing the outer wall 12, and a back board 14 located at an opposite side from the outer wall 12 in the cage 10.

The two side walls 11 each define an opening 111, the opening 111 facing each other. The two side walls 11 connect to both the outer wall 12 and the inner wall 13. The protrusion 311 of the movable portion 30 protrudes from the cage 10 via the opening 111 to secure the cage 10 onto the casing 2. The inner wall 13 is adjacent to the outer wall 12. The heat dissipation fan 3 is assembled between the inner wall 13 and the back board 14.

The side walls 11 each form a column 112, the column 112 facing each other. The two columns 112 are located adjacent to the outer wall 12 and extend towards each other. The two columns 112 penetrate through the hole 21 to rotatably assemble the handle 20 to the cage 10.

The outer wall 12 defines a receiving groove 121 and a cavity 122. The receiving groove 121 is configured for receiving the handle 20 therein. When the handle 20 is not needed, it can be turned from the horizontal state to the vertical state and be received in the receiving groove 121. A shape of the receiving groove 121 corresponds to that of the handle 20. In the illustrated embodiment, the receiving groove 121 is U shaped and inverted. The receiving groove 121 is adjacent to a peripheral side of the outer wall 12. The cavity 122 is defined in a middle portion of the outer wall 12 and communicates with the receiving groove 121. In the illustrated embodiment, the cavity 122 is substantially rectangular and chamfered.

Figure 6:
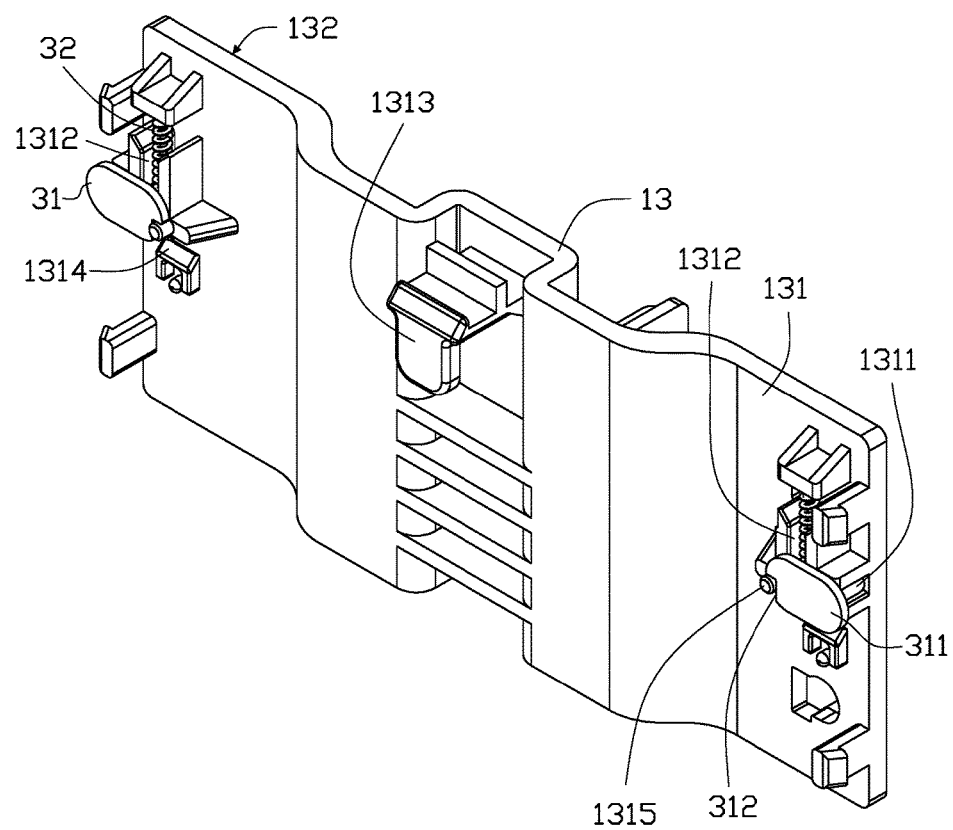
FIG. 6 is an isometric, assembled view of a movable portion and an inner wall of the fan fixing device in FIG. 4.
Figure 7:
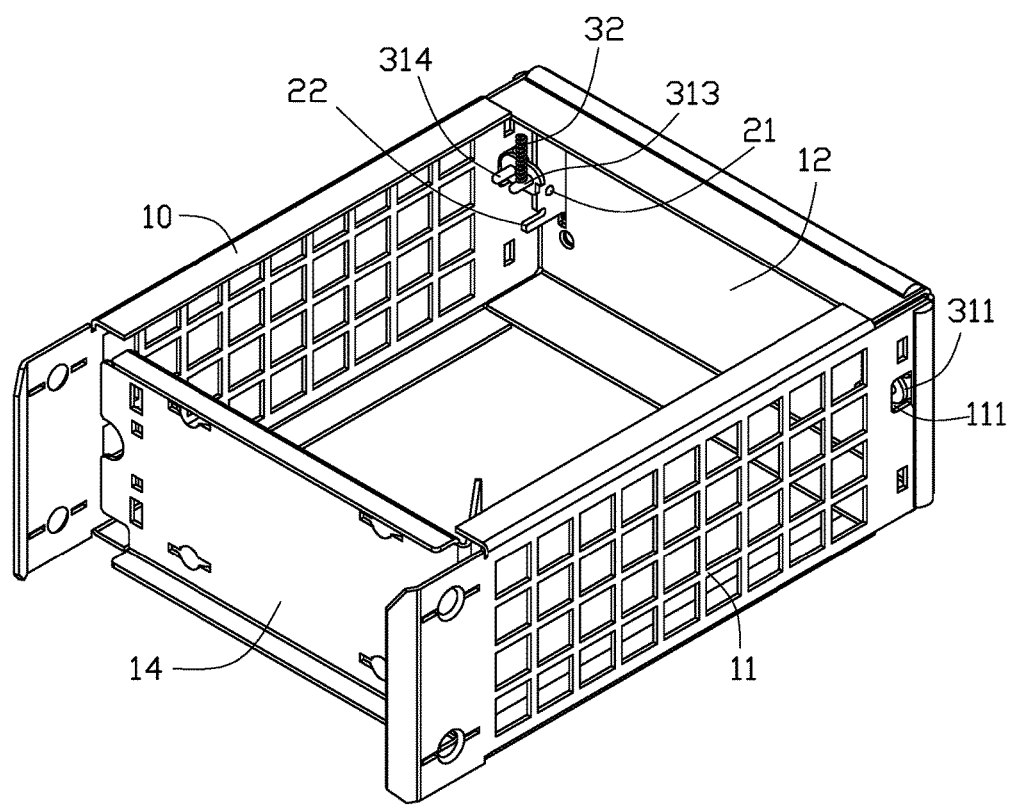
FIG. 7 is an isometric, assembled view of an outer wall and side walls of the fan fixing device in FIG. 4, wherein the cage is locked to the casing.
Figure 8:
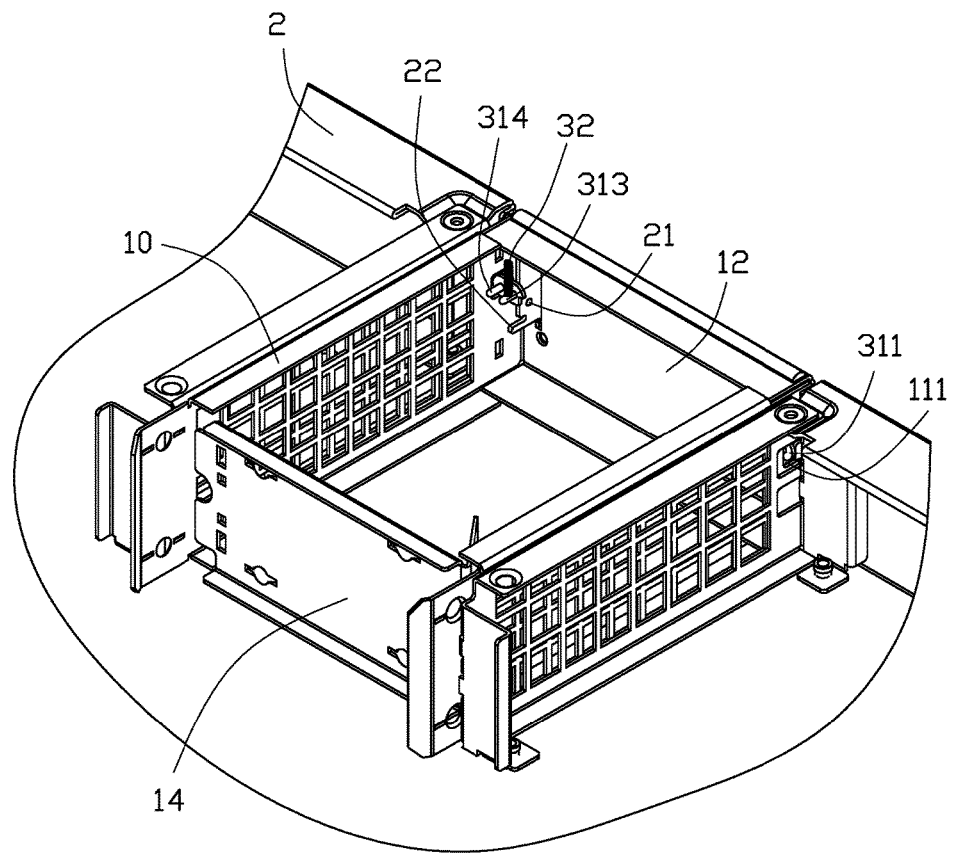
FIG. 8 is an isometric, assembled view of the fan fixing device and the casing in FIG. 3, wherein the cage is locked to the casing.
Figure 9:
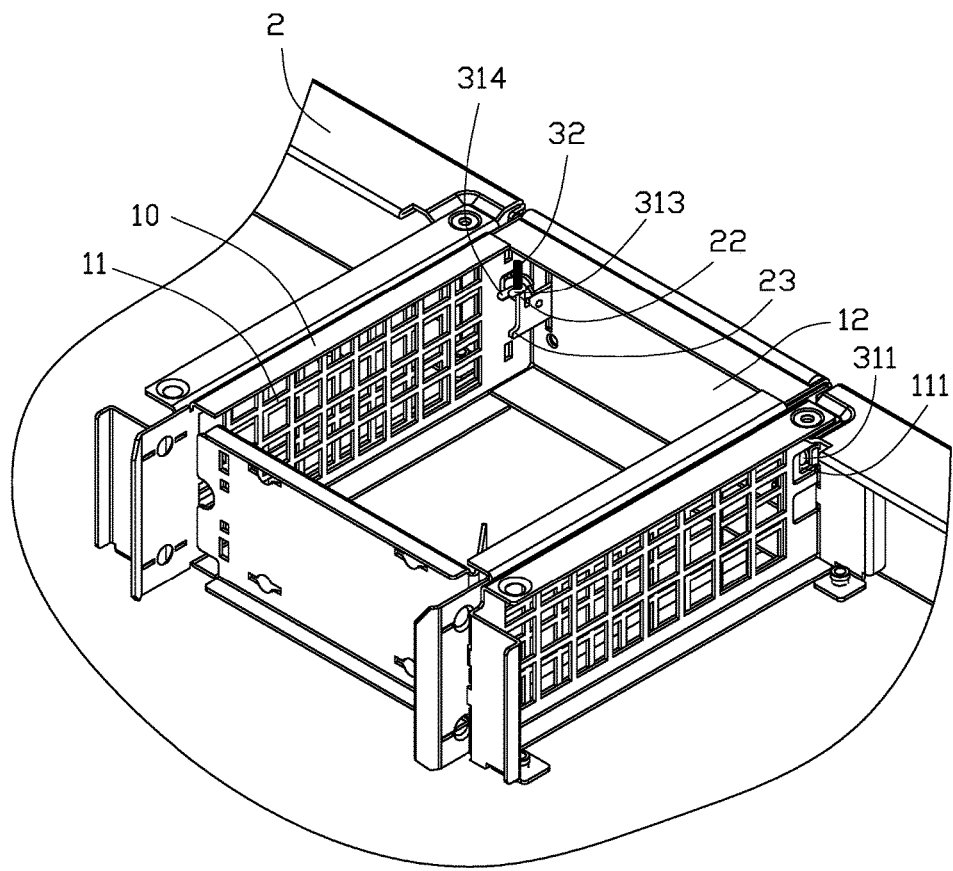
FIG. 9 is an isometric, assembled view of the fan fixing device and the casing in FIG. 3, wherein the cage is unlocked.
Figure 10:
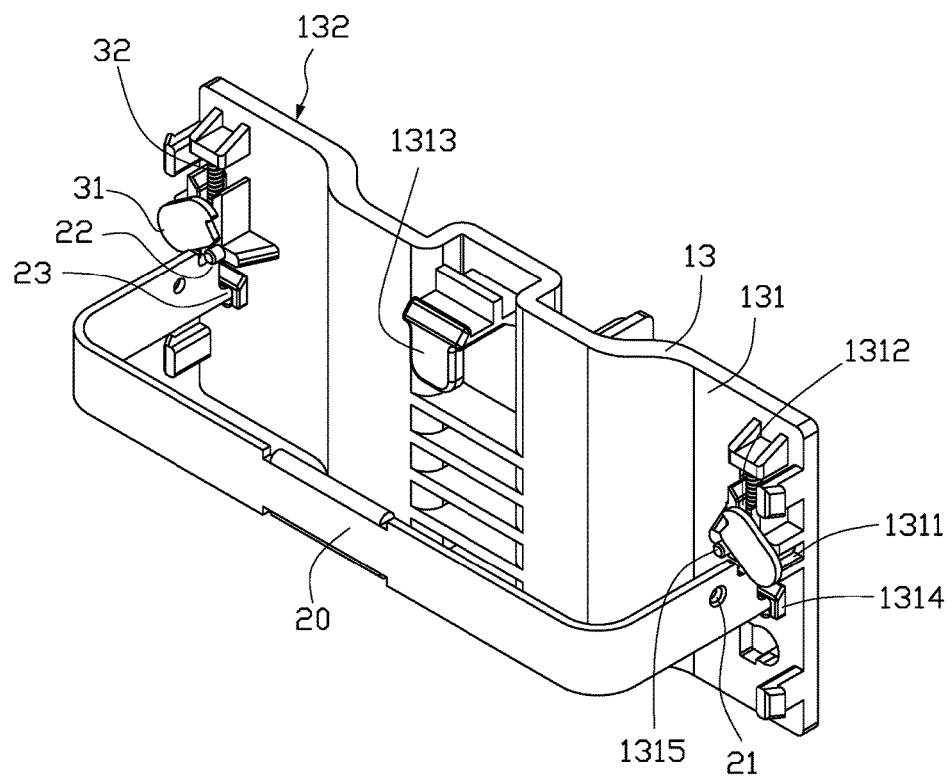
FIG. 10 is an isometric, assembled view of the inner wall, a movable portion and a handle of the fan fixing device in FIG. 3, wherein the cage is unlocked.
Figure 11:
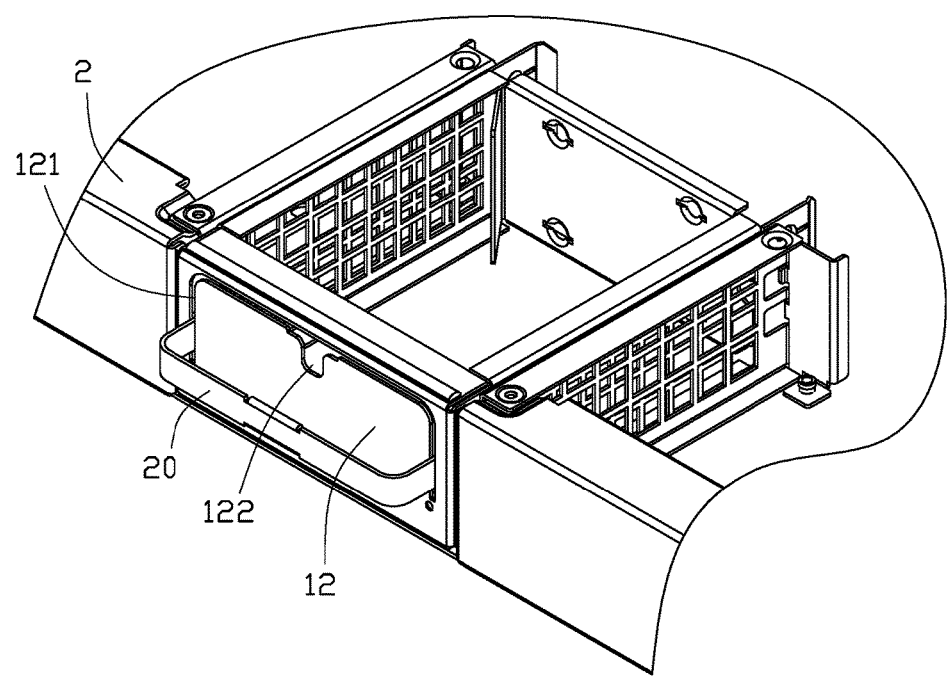
FIG. 11 is an isometric assembled view of the outer wall and the handle of the fan fixing device in FIG. 3, wherein the cage is unlocked.

Referring to FIG. 6 the inner wall 13 includes two opposite surfaces, a first surface 131 facing the outer wall 12 and a second surface 132 facing the back board 14. The movable portion 30 is fixed between the outer wall 12 and the inner wall 13 of the cage 10. Specifically, the movable portion 30 is fixed on the first surface 131 of the inner surface 13. The first surface 131 defines two slots and a barrier to receive the movable portion 30 and guide the movement of the movable portion 30.

The inner wall 13 is symmetrical about a central vertical axis with one movable portion 30 fixed on each side of the axis. Taking one side of the inner wall 13 as an example, a horizontal slot 1311 and a vertical slot 1312 are defined on the side of the inner wall 13, and a barrier 1315 is formed on the same side. The horizontal slot 1311 extends from a lateral side of the inner wall 13 towards the central axis along a predetermined distance. The horizontal slot 1311 is configured for receiving the second limit pillar 314. The vertical slot 1312 extends perpendicularly from a distal end of the horizontal slot 1311 upwards along a predetermined distance. The vertical slot 1312 is configured for receiving the first limit pillar 313 and the elastic element 32. The barrier 1315 is adjacent to the horizontal slot 1311 and the vertical slot 1312. The barrier 1315 is configured for clamping the gap 312 of the plate 31 when the cage 10 is locked in the casing 2, thereby avoiding the first limit pillar 313 to keep on sliding downwards under the elastic force of the elastic element 32.

The first surface 131 of the inner wall 13 forms two blocks 1314 corresponding to the blocking poles 23 of the handle 20. When the handle 20 is moved from the vertical state to the horizontal state, the blocking poles 23 are clamped into the corresponding block 1314 to limit the handle horizontally.

Referring to FIGS. 7 to 11, the first limit pillar 313 of the movable portion 30 can slide along and return along the vertical slot 1312 upwards and downwards under the urging of the elastic element 32, while the second limit pillar 314 moves along the horizontal slot 1311 towards the left and right.

When the handle 20 is moved from the vertical state to a horizontal state, the pushing pole 22 gets closer to the movable portion 30 until contact is made with the plate 31, and the pushing pole 22 pushes the plate 31 to compress the elastic element 32, the first limit pillar 313 moves in a vertical direction, the second limit pillar 314 moves in a horizontal direction, thereby moving the plate 31 back inside the casing 2 and clamping the cage 10 flush with the casing 2. Specifically, when the handle 20 is moved from the vertical state to the horizontal state, the handle 20 rotates with respect to the hole 21, the pushing pole 22 gets closer to the movable portion 30 till contacts with the plate 31 and pushes the plate 31 upwards. The first limit pillar 313 moves along the vertical slot 1312 upwards. The second limit pillar 314 moves along the horizontal slot 1311 from the lateral side of the inner wall 13 close to the central vertical axis of the inner wall 13. The elastic element 32 is elastic compressed with deformation larger and larger. The movable portion 30 moves towards the central axis of the inner wall 13. The protrusion 311 is back to inside of the cage 10 through the opening 111 of the side wall 11. The movable portion 30 is thereby unlocked and the cage 10 can be pulled out of the casing 2.

When the handle 20 is moved from the horizontal state to the vertical state, the handle 20 rotates with respect to the hole 21, and the pushing pole 22 rotates with respect to the hole 21. The pushing pole 22 moves downwards perpendicularly from contacting with the plate 31 to spacing from the plate 31. The first limit pillar 313 moves along the vertical slot 1312 downwards. The second limit pillar 314 moves along the horizontal slot 1311 from the central vertical axis of the inner wall 13 to the lateral side of the inner wall 13. The elastic element 32 recovers from being compressed. The movable portion 30 moves far away from the central axis of the inner wall 13. The protrusion 311 protrudes outside of the cage 10 through the opening 111 of the side wall 11 to clamp the casing 2. The movable portion 30 is thereby locked and the cage 10 can be locked to the casing 2.

When the handle 20 is moved from the horizontal state to the vertical state, if no force is applied to the handle 20, the handle 20 will be snapped from the vertical state to the horizontal state under the urging of the elastic element 32. The cage 10 will be snapped into the inner side of the casing 2 and the protrusion 34 will be clamped on the casing 2 to lock the cage.

Referring again to FIG. 5 and FIG. 6 again, the inner wall 13 further forms a pressing portion 1313. The pressing portion 1313 is formed on the central axis of the first surface 131. The pressing portion 1313 has a shape corresponding to the cavity 122 on the outer wall 12. The pressing portion 1313 is configured for clamping the handle 20. The pressing portion 1313 is bent downwards to form a hook. When the handle 20 is received in the receiving hole 121 of the outer wall 12, the handle 20 can be clamped by the pressing portion 1313, to secure the handle 20. When the handle 20 needs to be pushed out, the pressing portion 1313 can be pushed upwards to separate the handle 20 from the pressing portion 1313, then the handle 20 can be turned from the vertical state to the horizontal state.

The exemplary embodiments shown and described above are only examples. Many details are often found in the art such as other features of a fan fixing device. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A fan fixing device configured for assembling a heat dissipation fan in a computer, the fan fixing device comprising:
   a cage;
   a handle rotatably fixed on the cage, the handle having a pushing pole and defining two holes, the two holes each located at respective distal ends of the handle; and
   a movable portion movably and elastically connected to the cage, the movable portion comprising:
      a plate having a first limit pillar and a second limit pillar spaced from the first limit pillar; and
      an elastic element abutting the first limit pillar;
   wherein when the handle is at a vertical state, the pushing pole is spaced from the movable portion with a predetermined distance therebetween; and
   wherein when the handle is moved from the vertical state to a horizontal state, the pushing pole gets closer to the movable portion until the pushing pole contacts with the plate and pushes the plate to compress the elastic element, the first limit pillar moves vertically, the second limit pillar moves horizontally, thereby moving the plate back inside the casing and clamping the cage flush with the casing.

2. The fan fixing device of claim 1, wherein the plate comprises a protrusion formed on one end of the plate and a gap defined on another end of the plate, when the cage is locked to the casing, the protrusion protrudes out of the casing and clamps the cage flush with the casing.

3. The fan fixing device of claim 2, wherein the first limit pillar is located adjacent to the gap and the second limit pillar is located adjacent to the protrusion.

4. The fan fixing device of claim 2, wherein the protrusion is half circle shaped, and the gap is shaped as a quarter of a circle and opposite from the protrusion.

5. The fan fixing device of claim 2, wherein the cage comprises an outer wall adjacent to outer side of the casing and an inner wall facing the outer wall, and the movable portion is located between the outer wall and the inner wall.

6. The fan fixing device of claim 5, wherein the movable portion is assembled on the inner wall, the inner wall defines two slots perpendicular to each other to receive the movable portion and guide the movement of the movable portion.

7. The fan fixing device of claim 6, wherein the two slots comprises a horizontal slot and a vertical slot, the horizontal slot extends from a lateral side of the inner wall towards a central axis, and the vertical slot extends from a distal end of the horizontal slot perpendicularly.

8. The fan fixing device of claim 7, wherein the second limit pillar is movably received in the horizontal slot, the first limit pillar is movably received in the vertical slot.

9. The fan fixing device of claim 7, wherein the inner wall further forms a barrier, the barrier is adjacent to the horizontal slot and the vertical slot, the barrier is configured for clamping the gap of the plate when the cage is locked in the casing.

10. The fan fixing device of claim 5, wherein the inner wall further forms a pressing portion, the outer wall defines a cavity, the pressing portion has a shape corresponding to the cavity on the outer wall, and the pressing portion is configured for clamping the handle.

11. The fan fixing device of claim 10, wherein the outer wall further defines a receiving groove, the receiving groove is configured for receiving the handle therein.

12. The fan fixing device of claim 11, wherein the handle is U shaped, and the receiving groove is U shaped and inverted, when the cage is locked to the casing, the handle is received in the receiving groove at the vertical state.

13. The fan fixing device of claim 5, wherein the cage further comprises two side walls, the side walls connect to both the outer wall and the inner wall, the side walls each define an opening facing each other, the protrusion of the plate protrudes out of the casing from the opening.

14. The fan fixing device of claim 13, wherein the side walls each form a column, the columns are located adjacent to the outer wall and extend towards each other, the two columns penetrate through the hole of the handle to rotatably assemble the handle to the cage.

15. The fan fixing device of claim 5, wherein the handle forms a blocking pole at each distal end, the pushing pole extends perpendicular to the distal end of the handle, the blocking pole is perpendicular to the pushing pole.

16. The fan fixing device of claim 15, wherein the blocking pole extends from the distal end of the handle along a direction of the distal end of the handle extending along, when the handle is at the vertical state, the pushing pole is spaced from the movable portion; when the handle begins turn, the pushing pole rotates with respect to the hole of the handle and gets closer to the movable portion until the pushing pole contacts with the plate of the movable portion.

17. The fan fixing device of claim 15, wherein the inner wall further defines two blocks, when the handle is moved from the vertical state to the horizontal state, the blocking poles are clamped into the corresponding block to limit the handle in the horizontal direction.

\* \* \* \* \*